(12) United States Patent
Salah et al.

(10) Patent No.: US 11,647,406 B2
(45) Date of Patent: May 9, 2023

(54) METHOD AND APPARATUS FOR USER EQUIPMENT POWER CONSUMPTION ENHANCEMENT IN MOBILE COMMUNICATIONS

(71) Applicant: MediaTek Singapore Pte. Ltd., Singapore (SG)

(72) Inventors: Abdellatif Salah, Cambridge (GB); Francesc Boixadera-Espax, Cambridge (GB); Mohammed S Aleabe Al-Imari, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 85 days.

(21) Appl. No.: 15/931,533

(22) Filed: May 13, 2020

(65) Prior Publication Data

US 2020/0367080 A1 Nov. 19, 2020

Related U.S. Application Data

(60) Provisional application No. 62/848,061, filed on May 15, 2019.

(51) Int. Cl.
*H04W 24/08* (2009.01)
*H04W 72/04* (2009.01)
(Continued)

(52) U.S. Cl.
CPC .......... *H04W 24/08* (2013.01); *H04L 1/0038* (2013.01); *H04W 52/0261* (2013.01); *H04W 72/042* (2013.01); *H04W 72/1273* (2013.01)

(58) Field of Classification Search
None
See application file for complete search history.

(56) References Cited

U.S. PATENT DOCUMENTS

2016/0198408 A1 7/2016 Jhang et al.
2019/0110279 A1* 4/2019 Behravan .......... H04W 72/0446
(Continued)

FOREIGN PATENT DOCUMENTS

CN 108702764 A 10/2018
CN 108713346 A * 10/2018
(Continued)

OTHER PUBLICATIONS

China National Intellectual Property Administration, International Search Report and Written Opinion for PCT/CN2020/090514, dated Aug. 18, 2020.

(Continued)

*Primary Examiner* — Chirag G Shah
*Assistant Examiner* — Srinivasa R Reddivalam
(74) *Attorney, Agent, or Firm* — Han IP PLLC; Andy M. Han

(57) ABSTRACT

Various solutions for user equipment power consumption enhancement for ultra-reliable low-latency communication (URLLC) services with respect to user equipment and network apparatus in mobile communications are described. An apparatus may determine a first physical downlink control channel (PDCCH) monitoring configuration and a second PDCCH monitoring configuration. The apparatus may use the first PDCCH monitoring configuration to perform PDCCH monitoring. The apparatus may determine whether a switch condition is triggered. The apparatus may switch to the second PDCCH monitoring configuration to perform the PDCCH monitoring in an event that the switch condition is triggered.

16 Claims, 4 Drawing Sheets

(51) Int. Cl.
  *H04W 52/02*    (2009.01)
  *H04L 1/00*     (2006.01)
  *H04W 72/12*    (2009.01)
  *H04W 72/1273*  (2023.01)

(56) References Cited

U.S. PATENT DOCUMENTS

| | | | | |
|---|---|---|---|---|
| 2020/0154412 A1* | 5/2020 | Lee | ............... | H04L 5/001 |
| 2020/0169991 A1* | 5/2020 | Lin | ............... | H04L 5/0053 |
| 2020/0229092 A1* | 7/2020 | Wu | ............... | H04W 76/11 |
| 2020/0367253 A1* | 11/2020 | Kim | ............... | H04W 72/042 |
| 2021/0037558 A1* | 2/2021 | Xu | ............... | H04W 72/042 |
| 2021/0144798 A1* | 5/2021 | Jiang | ............... | H04W 76/28 |
| 2021/0168809 A1* | 6/2021 | Sun | ............... | H04W 52/0212 |

FOREIGN PATENT DOCUMENTS

| | | |
|---|---|---|
| CN | 108713346 A | 10/2018 |
| CN | 109963326 A | 7/2019 |
| WO | WO 2020063755 A1 | 4/2020 |

OTHER PUBLICATIONS

Ericsson, Benefits of Enhanced PDCCH Monitoring Capability for URLLC, 3GPP TSG-RAN WG1 Meeting #97, R1-1906109, May 4, 2019.
Ericsson, Monitoring Capability Enhancements for URLLC, 3GPP TSG-RAN WG1 Meeting #96bis, R1-1904135, Apr. 3, 2019.

* cited by examiner

METHOD AND APPARATUS FOR USER EQUIPMENT POWER CONSUMPTION ENHANCEMENT IN MOBILE COMMUNICATIONS

CROSS REFERENCE TO RELATED PATENT APPLICATION(S)

The present disclosure is part of a non-provisional patent application claiming the priority benefit of U.S. Provisional Patent Application No. 62/848,061, filed on 15 May 2019, the content of which being incorporated by reference in its entirety.

TECHNICAL FIELD

The present disclosure is generally related to mobile communications and, more particularly, to user equipment power consumption enhancement for ultra-reliable low-latency communication (URLLC) services with respect to user equipment and network apparatus in mobile communications.

BACKGROUND

Unless otherwise indicated herein, approaches described in this section are not prior art to the claims listed below and are not admitted as prior art by inclusion in this section.

In Release 15 (Rel-15) of the $3^{rd}$ Generation Partnership Project (3GPP) technical specification for New Radio (NR), two PDCCH monitoring cases have been defined. In a first case (Case 1), a PDCCH monitoring periodicity of 14 or more symbols has been defined. More specifically, in Case 1-1, PDCCH monitoring can be on up to three orthogonal frequency-division multiplexing (OFDM) symbols at the beginning of a slot and, in Case 1-2, PDCCH monitoring can be on any span of up to three consecutive OFDM symbols of a slot. For a given user equipment (UE), all search space configurations are within the same span of three consecutive OFDM symbols in the slot. In a second case (Case 2), a PDCCH monitoring periodicity of less than 14 symbols has been defined. This includes the PDCCH monitoring of up to three OFDM symbols at the beginning of a slot. The support of Case 2 is necessary to enable PDCCH monitoring within the slot and to allow for low-latency scheduling for URLLC services.

In Rel-15, budgets of the number of control channel elements (#CCE) and the number of blind decodes (#BD) were defined on a per-slot basis for different numerologies. In Release 16 (Rel-16) of the 3GPP technical specification for NR, an increased PDCCH monitoring capability (with respect to the maximum number of non-overlapped CCEs and BDs per slot or span) is needed. Increased PDCCH monitoring capability leads to reduced latency and improvement in PDCCH blocking. However, increase PDCCH monitoring capability tends to result in increased UE complexity and power consumption.

Accordingly, how to meet stringent requirements for URLLC services without consuming too much power and increasing UE complexity becomes an important issue for the newly developed wireless communication network. Therefore, some power consumption enhancement mechanisms are needed to allow for reduced power consmuption while still meeting the stringent URLLC latency and reliability requirements.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to user equipment power consumption enhancement for URLLC services with respect to user equipment and network apparatus in mobile communications.

In one aspect, a method may involve an apparatus determining a first PDCCH monitoring configuration and a second PDCCH monitoring configuration. The method may also involve the apparatus using the first PDCCH monitoring configuration to perform PDCCH monitoring. The method may further involve the apparatus determine whether a switch condition is triggered. The method may further involve the apparatus switching to the second PDCCH monitoring configuration to perform the PDCCH monitoring in an event that the switch condition is triggered.

In one aspect, an apparatus may comprise a transceiver which, during operation, wirelessly communicates with a network node of a wireless network. The apparatus may also comprise a processor communicatively coupled to the transceiver. The processor, during operation, may perform operations comprising determining a first PDCCH monitoring configuration and a second PDCCH monitoring configuration. The processor may also perform operations comprising using the first PDCCH monitoring configuration to perform PDCCH monitoring. The processor may further perform operations comprising determine whether a switch condition is triggered. The processor may further perform operations comprising switching to the second PDCCH monitoring configuration to perform the PDCCH monitoring in an event that the switch condition is triggered.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT), Narrow Band Internet of Things (NB-IoT) and Industrial Internet of Things (IIoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Figure 1:
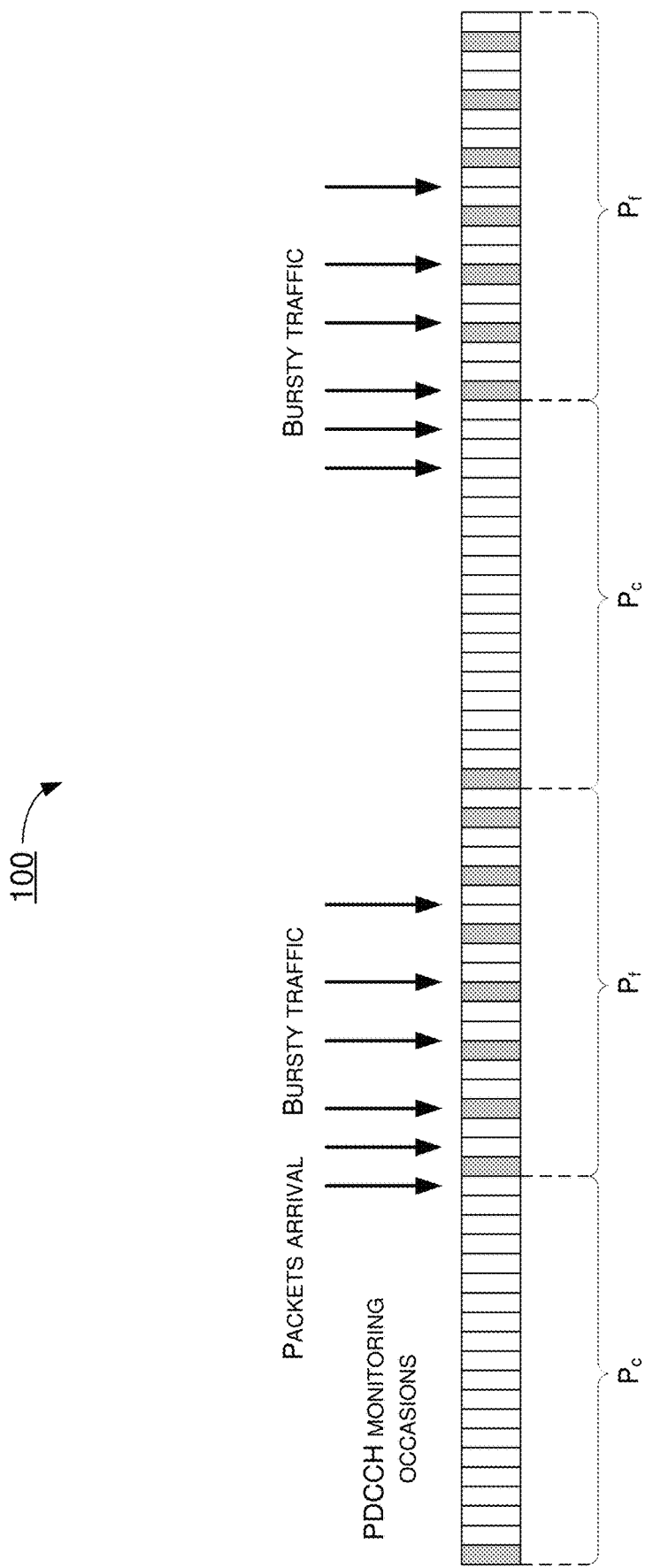
FIG. 1 is a diagram depicting an example scenario under schemes in accordance with implementations of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to user equipment power consumption enhancement for URLLC services with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

The current Rel-15 and Rel-16 URLLC operation is very power hungry compared to the eMBB operation. Power efficiency for URLLC traffic wasn't considered for optimization in Rel-15 and Rel-16 and remains a critical concern especially for battery-powered devices and small form factor devices. The main reason behind the increased power consumption for URLLC is the control channel monitoring mechanism such as very frequent PDCCH monitoring within a slot to reduce the PDCCH alignement latency, increased number of CCEs which leads to increased channel estimation effort, and increased number of PDCCH candidates which leads to increased number of blind decodes. Thus, some power consumption enhancement mechanisms are needed to allow for reduced power consmuption while still meeting the stringent URLLC latency and reliability requirements.

In view of the above, the present disclosure proposes a number of schemes pertaining to optimizing power efficiency for control channel monitoring in URLLC with respect to the UE and the network apparatus. According to the schemes of the present disclosure, the UE may be configured with a plurality of control channel (e.g., physical downlink control channel (PDCCH)) monitoring configurations. Some control channel monitoring configurations may have frequent monitoring occasions or short monitoring periods to meet latency and reliability requirements. Some control channel monitoring configurations may have few monitoring occasions or long monitoring periods to reduce power consumption. The UE may be able to dynamically switch between these control channel monitoring configurations based on the traffic type or service requirements. Accordingly, the UE may operate in high power consumption mode when needed and return to low power consumption mode otherwise. With such dynamic switch mechanism, UE power consumption may be properly reduced while considering stringent requirements for some specific services.

Specifically, the UE may determine a first PDCCH monitoring configuration and a second PDCCH monitoring configuration. For normal services (e.g., tolerant latency and reliability requirements), the UE may be configured to use the first PDCCH monitoring configuration to perform the PDCCH monitoring. The UE may determine whether a switch condition is triggered for switching to the second PDCCH monitoring configuration. The UE may switch to the second PDCCH monitoring configuration to perform the PDCCH monitoring in an event that the switch condition is triggered. The second PDCCH monitoring configuration is different from the first PDCCH monitoring configuration. The switch condition may comprise that a packet arrival pattern or a traffic type is changed. The UE may be configured to switch to a proper PDCCH monitoring configuration for power efficiency according to the packet arrival pattern or the traffic type.

It would be beneficial if the time domain instances in which the UE is expected to monitor PDCCH can change dynamically based on the packets arrival pattern to optimize power consumption. Latency criticality may be different in different periods. For example, a robotic arm may require a 1 millisecond latency while moving, but a longer latency may be sufficient when the arm is not moving. The UE may determine the PDCCH periodicity/monitoring pattern implicitly based on some signalling or based on the behaviour/characteristic of the traffic. The change may also be signalled explicitly by the network node for downlink traffic or triggered by the UE for uplink traffic. For example, the UE may be configured with two PDCCH monitoring configurations with two different patterns. These two PDCCH monitoring configurations may comprise a coarse PDCCH scheduling pattern with reduced PDCCH monitoring occasions and a fine PDCCH scheduling pattern with dense PDCCH monitoring occasions (e.g., suitable to reduce the PDCCH alignment and meet the URLLC required latency). In some implementations, the UE may be configured with two or multiple search space sets that are monitored at certain period of times and the monitoring may be triggered with an implicit or explicit signalling. For example, the coarse PDCCH scheduling pattern may be associated with one search space set. The fine PDCCH monitoring pattern may be associated with another search space set.

FIG. 1 illustrates an example scenario 100 under schemes in accordance with implementations of the present disclosure. Scenario 100 involves a UE and a network node, which may be a part of a wireless communication network (e.g., an LTE network, an LTE-Advanced network, an LTE-Advanced Pro network, a 5G network, an NR network, an IoT network, an NB-IoT network or an IIoT network). Scenario 100 illustrates the switch mechanism between two PDCCH monitoring configurations. The UE may be configured with a first PDCCH monitoring configuration and a second PDCCH monitoring configuration. The first PDCCH monitoring configuration may comprise a first PDCCH monitoring pattern (e.g., a coarse PDCCH scheduling pattern). The second monitoring configuration may comprise a second PDCCH monitoring pattern (e.g., a fine PDCCH scheduling pattern).

The URLLC traffic may be periodic and deterministic or bursty with packets arrival peaks. In an event that the URLLC traffic is bursty, the fine PDCCH scheduling pattern may be triggered at the start of the packets arrival. For example, the UE may be configured to determine whether the URLLC traffic is activated/received. The UE may switch to the fine PDCCH scheduling pattern within slot $P_f=\{1, 0, 0, 1, 0, 0, 1, 0, 0, 1, 0, 0, 1, 0\}$ for the URLLC traffic. In an event that no URLLC traffic is activated/received, the UE may switch to the coarse PDCCH scheduling pattern within slot $P_c=\{1, 0, 0, 0, 0, 0, 0, 0, 0, 0, 0, 0, 0, 0\}$ to reduce power consumption.

Figure 2:
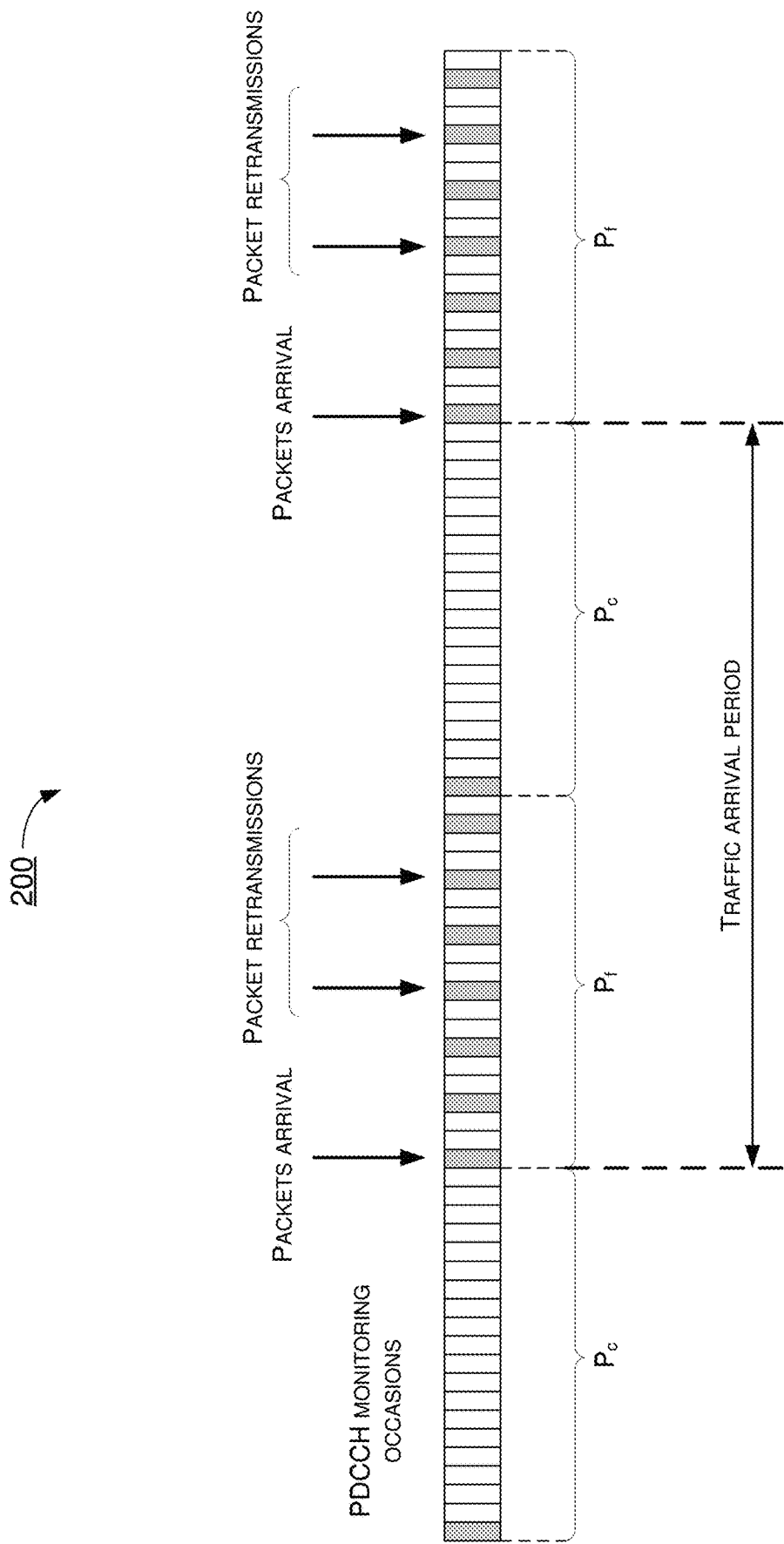
FIG. 2 is a diagram depicting an example scenario under schemes in accordance with implementations of the present disclosure.

FIG. 2 illustrates an example scenario 200 under schemes in accordance with implementations of the present disclosure. Scenario 200 involves a UE and a network node, which may be a part of a wireless communication network. Scenario 200 illustrates the switch mechanism between two PDCCH monitoring configurations. Similarly, the UE may be configured with a first PDCCH monitoring configuration (e.g., a coarse PDCCH scheduling pattern) and a second monitoring configuration (e.g., a fine PDCCH scheduling pattern). In an event that the URLLC traffic is periodic, the finer PDCCH scheduling pattern may be triggered periodically at the start of each transmission period. As shown in FIG. 2, each traffic arrival period may comprise a slot $P_f$ and a slot $P_c$. Thus, at the start of each traffic arrival period, the UE may be configured to perform PDCCH monitoring with the fine PDCCH scheduling pattern within slot $P_f=\{1, 0, 0, 1, 0, 0, 1, 0, 0, 1, 0, 0, 1, 0\}$. After slot $P_f$, the UE may be configured to perform PDCCH monitoring with the coarse PDCCH scheduling pattern within slot $P_c=\{1, 0, 0, 0, 0, 0, 0, 0, 0, 0, 0, 0, 0, 0\}$ to reduce power consumption.

Another possible alternative is to define the coarse/fine PDCCH monitoring concept by using the PDCCH monitoring configuration parameter (e.g., Monitoring-periodicity-PDCCH-slot). The first PDCCH monitoring configuration may comprise a first PDCCH monitoring configuration parameter (e.g., a first PDCCH monitoring periodicity). The second PDCCH monitoring configuration may comprise a second PDCCH monitoring configuration parameter (e.g., a second PDCCH monitoring periodicity) which is different from the first PDCCH monitoring configuration parameter. The Monitoring-periodicity-PDCCH-slot parameter may be configured via radio resource control (RRC) signaling and takes one of the following values 1-slot, 2-slots, 5-slots, 10-slots and 20-slots. Changing dynamically the Monitoring-periodicity-PDCCH-slot parameter may be dynamically signaled via DCI and may be an option without changing the PDCCH monitoring pattern. For example,1-slot periodicity may be used when there is URLLC traffic, and another periodicity (e.g., 10-slots periodicity) may be triggered when there is no URLLC traffic. It is also possible to switch dynamically between two PDCCH monitoring configurations with two different values of Monitoring-periodicity-PDCCH-slot (e.g., one fine and one coarse). In another example, it is also possible to switch dynamically between two search space sets with two different associated values of Monitoring-periodicity-PDCCH-slot (e.g., one fine and one coarse).

In some implementations, the switch condition for triggering the switch between different PDCCH monitoring configurations may comprise a downlink or uplink control signal (e.g., downlink control information (DCI)). For example, the network node may trigger each configuration based on the knowledge of packets in the queue for downlink traffic. In another example, the network node may trigger each configuration based on the scheduling request (SR) (e.g., associated to high priority logical channel) sent by the UE for dynamic grant or the initial PUSCH for configured grant or based on the reported buffer status report (BSR) information on UE queue status. On the other hand, the UE may be able to indicate the need to switch to different configuration. The UE may be configured to transmit an uplink signal to indicate a need to switch to the first PDCCH monitoring configuration or the second PDCCH monitoring configuration. For example, the need for activation of fine configuration may be indicated by the SR or the initial PUSCH for configured grant or any other dedicated signal. The need for de-activation of the fine configuration may be indicated by the reported BSR information. In addition, triggering one PDCCH monitoring configuration may also implicitly mean deactivating another PDCCH monitoring configuration. Triggering the fine PDCCH monitoring configuration may also be done implicitly upon the decoding of the URLLC DCI format, some specific radio network temporary identifiers (RNTIs) (e.g., modulation coding scheme-cell-RNTI (MCS-C-RNTI)), or the reception of the DCI in a specific search space or control resource set (CORESET). It may also be done explicitly via a defined field in the DCI or other control signal.

Further reduction of the UE complexity and power consumption may be achieved by reducing the number of monitored control channel elements (CCEs) and the number of blind decodings (BDs). Thus, the number of PDCCH candidates and the number of CCEs may also be adapted depending on the traffic type or service requirements. Specifically, downlink control information is sent with PDCCH. PDCCH is carried from the network node to the UE by 1, 2, 4, 8 or 16 CCEs to accommodate different DCI payload size or different coding rates. The values 1, 2, 4, 8 and 16 are associated with different aggregation levels. Each CCE consists of 6 resource element groups (REGs). Each REG is constituted of 12 resource elements (Res) of one orthogonal frequency division multiplexing (OFDM) symbol in one resource block (RB). CCEs are a set of time-frequency resources that the UE needs to monitor within CORESETs to fetch the control information. Monitoring the CCEs requires channel estimation effort at the UE side for all the CCEs leading to UE complexity. To limit such complexity, a total number of CCEs that the network node could configure in a slot shouldn't exceed specified values defined as upper limit or threshold. These limits are called CCE budgets. Similar to CCEs, performing BD also involves a lot of UE computation effort to attempt to decode PDCCH leading to a lot of complexity. Therefore, to limit UE complexity, specified budgets have been defined as an upper limit of the possible blind decodings the UE can do.

For example, in Rel-15, the number of CCEs (#CCEs) budgets are defined per slot as 56, 56, 48 and 32 for µ (e.g., subcarrier spacing configuration)=0, 1, 2, and 3 respectively. The number of BDs (#BDs) budgets are defined per slot as 44, 36, 22 and 20 for µ=0, 1, 2, and 3 respectively. In Rel-16, the #CCEs budgets associated with µ=0 or 1 are defined per span as 18, 36 and 56 for spans (2, 2), (4, 3), and (7, 3) respectively. The #BDs budgets associated with µ=0 are defined per span as 14, 28 and 44 for spans (2, 2), (4, 3), and (7, 3) respectively. The #BDs budgets associated with µ=1 are defined per span as 12, 24 and 36 for spans (2, 2), (4, 3), and (7, 3) respectively.

In some implementations, the first PDCCH monitoring configuration may comprise a first #CCE and/or #BD budget (e.g., Rel-15 #CCE and/or #BD budget). The second PDCCH monitoring configuration may comprise a second #CCE and/or #BD budget (e.g., Rel-16 #CCE and/or #BD budget) which is different from the first #CCE and/or #BD budget. When there is no URLLC traffic, the UE doesn't need to do the channel estimation and the decoding of a large number of CCEs. For example, the UE may use the first #CCE and/or #BD budget to perform PDCCH monitoring when there is no URLLC traffic. The UE may use the second #CCE and/or #BD budget to perform PDCCH monitoring for URLLC traffic. The second #CCE and/or #BD budget may be larger than the first #CCE and/or #BD budget. In another example, the increased #CCEs and #BDs budgets in Rel-16 for URLLC service may be applied only for the fine PDCCH monitoring. The coarse PDCCH monitoring may fall-back to the Rel-15 maximum number of CCEs and/or BDs or to the #CCEs and/or #BDs defined for enhanced mobile broadband (eMBB) services (e.g., in Rel-15 or Rel-16). The UE may also be configured to switch between two #CCEs and/or #BDs budgets (e.g., Rel-16 and Rel-15 budgets).

In some implementations, the PDCCH monitoring span may be used to distribute the #CCEs and/or #BDs budget within the slot. The first PDCCH monitoring configuration may comprise a first PDCCH monitoring span configuration. The second PDCCH monitoring configuration may comprise a second PDCCH monitoring span configuration which is different from the first PDCCH monitoring span configuration. The UE may be configured with two or more PDCCH monitoring span configurations. For example, the UE may report two or multiple sets of candidates (X,Y) or (X,Y,M). Each set may be associated to a coarse or fine PDCCH monitoring spans. In an event that the UE reports two sets of candidates, the UE may end up with two PDCCH monitoring span configurations. One may be coarse PDCCH monitoring span, and one may be fine PDCCH monitoring span. In another example, the UE may also have two or more PDCCH monitoring span configurations with different #CCEs and/or #BDs budgets per span. One PDCCH monitoring span configuration may have large #CCEs and/or #BDs budgets to meet the URLLC reliability and latency requirements. Another PDCCH monitoring span configuration may have reduced #CCEs and/or #BDs budgets for reduced power consumption. Switching between the two monitoring span configurations may be dynamic or semi-static.

In some implementations, new #CCEs and/or #BDs budgets may be defined for some specific traffic types (e.g., URLLC traffic). The #CCEs and #BDs budgets to be defined for URLLC traffic may be much larger than the specified budgets in Rel-15 (e.g., around 2 times larger). In Rel-16, it may be possible to define separate budgets for eMBB and URLLC to reduce the impact on eMBB PDCCH monitoring. For example, the first PDCCH monitoring configuration may be used on eMBB traffic. The second PDCCH monitoring configuration may be used on URLLC traffic. One possible option for URLLC operation is to fall-back to the eMBB or Rel-15 budgets when there is no URLLC traffic. In another example, the eMBB or Rel-15 budgets may be defined as default and the new URLLC budgets may be activated/de-activated with the URLLC traffic. The UE may be able to switch between different #CCEs and/or #BDs budgets based on different traffic types.

In some implementations, the switch condition for triggering switch between different PDCCH monitoring configurations or different #CCEs and/or #BDs budgets may comprise, for example and without limitation, the start/end of channel occupancy time (COT) duration in the operation in unlicensed spectrum or start/end of URLLC/XR or other traffic types. The switch condition may be implemented by implicit or explicit downlink or uplink control signals.

In some implementations, the aforementioned mechanisms/schemes may be applied to any control monitoring demanding applications, services or deployment such as unlicenced spectrum where there is an intensive UE control monitoring. The proposals in the present disclosure may also be promoted in the Rel-17 extended reality (XR) and cloud gaming study item. XR and cloud gaming may be some of the most important 5G media applications under consideration in the industry and may have a lot of similarities with URLLC especially on the reliability and the latency aspects. The power consumption and battery life of the device for a long duration cloud gaming and XR experience may be an important aspect that will be considered in the future.

Illustrative Implementations

Figure 3:
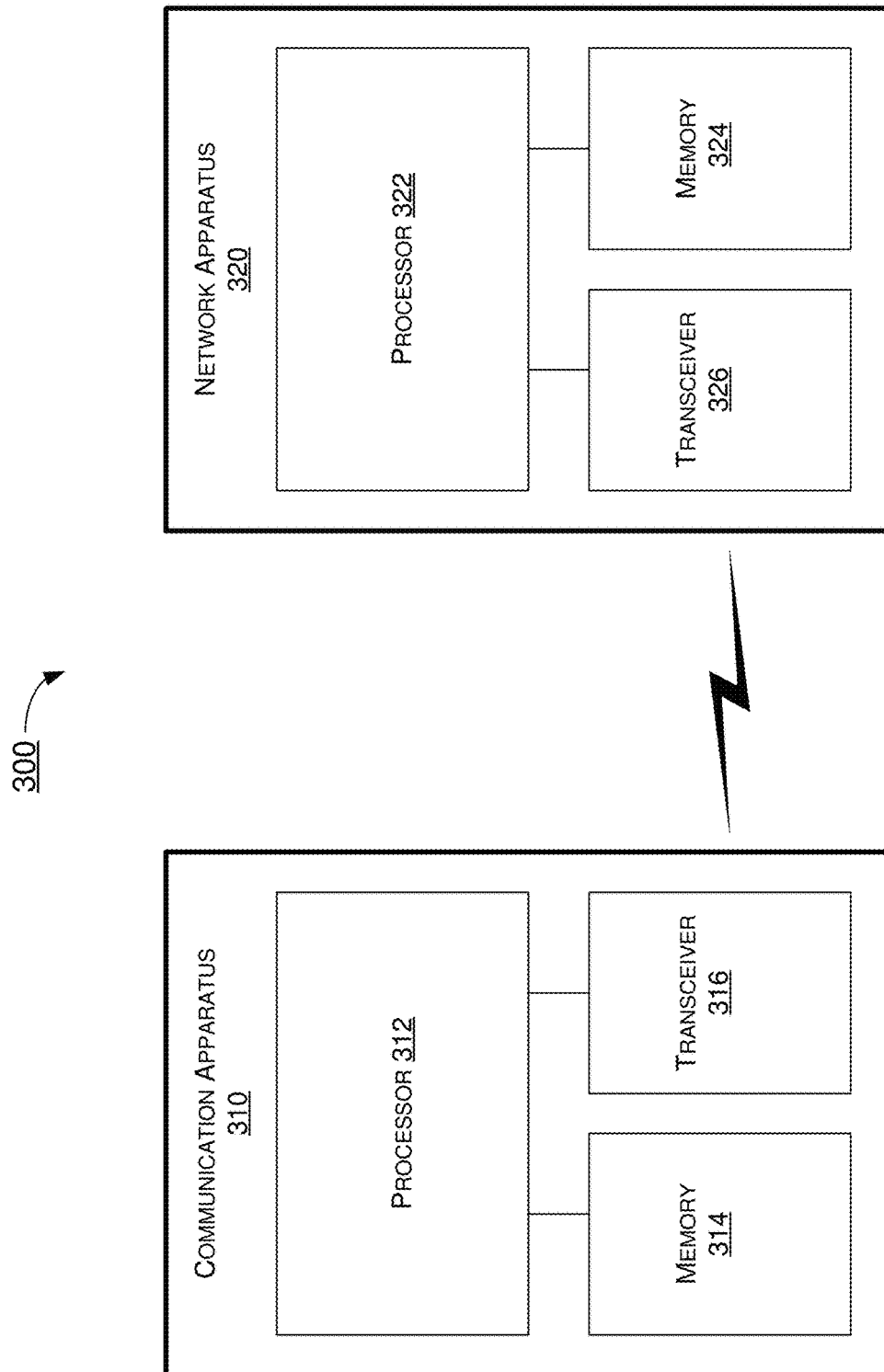
FIG. 3 is a block diagram of an example communication apparatus and an example network apparatus in accordance with an implementation of the present disclosure.

FIG. 3 illustrates an example communication apparatus 310 and an example network apparatus 320 in accordance with an implementation of the present disclosure. Each of communication apparatus 310 and network apparatus 320 may perform various functions to implement schemes, techniques, processes and methods described herein pertaining to UE power consumption enhancement for URLLC services with respect to user equipment and network apparatus in wireless communications, including mechanisms/schemes described above as well as process 400 described below.

Communication apparatus 310 may be a part of an electronic apparatus, which may be a UE such as a portable or mobile apparatus, a wearable apparatus, a wireless communication apparatus or a computing apparatus. For instance, communication apparatus 310 may be implemented in a smartphone, a smartwatch, a personal digital assistant, a digital camera, or a computing equipment such as a tablet computer, a laptop computer or a notebook computer. Communication apparatus 310 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 310 may be implemented in a smart thermostat, a smart fridge, a smart door lock, a wireless speaker or a home control center. Alternatively, communication apparatus 310 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 310 may include at least some of those components shown in FIG. 3 such as a processor 312, for example. Communication apparatus 310 may further include one or more other components not pertinent to the proposed scheme of the present disclosure (e.g., internal power supply, display device and/or user interface device), and, thus, such component(s) of communication apparatus 310 are neither shown in FIG. 3 nor described below in the interest of simplicity and brevity.

Network apparatus 320 may be a part of an electronic apparatus, which may be a network node such as a base station, a small cell, a router or a gateway. For instance, network apparatus 320 may be implemented in an eNodeB in an LTE, LTE-Advanced or LTE-Advanced Pro network or in a gNB in a 5G, NR, IoT, NB-IoT or IIoT network. Alternatively, network apparatus 320 may be implemented in the form of one or more IC chips such as, for example and without limitation, one or more single-core processors, one or more multi-core processors, or one or more RISC or CISC processors. Network apparatus 320 may include at least some of those components shown in FIG. 3 such as a processor 322, for example. Network apparatus 320 may further include one or more other components not pertinent to the proposed scheme of the present disclosure (e.g., internal power supply, display device and/or user interface device), and, thus, such component(s) of network apparatus 320 are neither shown in FIG. 3 nor described below in the interest of simplicity and brevity.

In one aspect, each of processor 312 and processor 322 may be implemented in the form of one or more single-core processors, one or more multi-core processors, or one or more CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including power consumption reduction in a device (e.g., as represented by communication apparatus 310) and a network (e.g., as represented by network apparatus 320) in accordance with various implementations of the present disclosure.

In some implementations, communication apparatus 310 may also include a transceiver 316 coupled to processor 312 and capable of wirelessly transmitting and receiving data. In some implementations, communication apparatus 310 may further include a memory 314 coupled to processor 312 and capable of being accessed by processor 312 and storing data therein. In some implementations, network apparatus 320 may also include a transceiver 326 coupled to processor 322 and capable of wirelessly transmitting and receiving data. In some implementations, network apparatus 320 may further include a memory 324 coupled to processor 322 and capable of being accessed by processor 322 and storing data therein. Accordingly, communication apparatus 310 and network apparatus 320 may wirelessly communicate with each other via transceiver 316 and transceiver 326, respectively. To aid better understanding, the following description of the operations, functionalities and capabilities of each of communication apparatus 310 and network apparatus 320 is provided in the context of a mobile communication environment in which communication apparatus 310 is implemented in or as a communication apparatus or a UE and network apparatus 320 is implemented in or as a network node of a communication network.

In some implementations, processor 312 may determine a first PDCCH monitoring configuration and a second PDCCH monitoring configuration. For normal services (e.g., tolerant latency and reliability requirements), processor 312 may be configured to use the first PDCCH monitoring configuration to perform, via transceiver 316, the PDCCH monitoring. Processor 312 may determine whether a switch condition is triggered for switching to the second PDCCH monitoring configuration. Processor 312 may switch to the second PDCCH monitoring configuration to perform, via transceiver 316, the PDCCH monitoring in an event that the switch condition is triggered. The second PDCCH monitoring configuration is different from the first PDCCH monitoring configuration. The switch condition may comprise that a packet arrival pattern or a traffic type is changed. Processor 312 may be configured to switch to a proper PDCCH monitoring configuration for power efficiency according to the packet arrival pattern or the traffic type.

In some implementations, processor 312 may determine the PDCCH periodicity/monitoring pattern implicitly based on some signalling or based on the behaviour/characteristic of the traffic. The change may also be signalled explicitly by network apparatus 320 for downlink traffic or triggered by communication apparatus 310 for uplink traffic. For example, processor 312 may be configured with two PDCCH monitoring configurations with two different patterns. These two PDCCH monitoring configurations may comprise a coarse PDCCH scheduling pattern with reduced PDCCH monitoring occasions and a fine PDCCH scheduling pattern with dense PDCCH monitoring occasions (e.g., suitable to reduce the PDCCH alignment and meet the URLLC required latency). In some implementations, processor 312 may be configured with two or multiple search space sets that are monitored at certain period of times and the monitoring may be triggered with an implicit or explicit signalling. For example, the coarse PDCCH scheduling pattern may be associated with one search space set. The fine PDCCH monitoring pattern may be associated with another search space set.

In some implementations, processor 312 may be configured with a first PDCCH monitoring configuration and a second PDCCH monitoring configuration. The first PDCCH monitoring configuration may comprise a coarse PDCCH scheduling pattern. The second monitoring configuration may comprise a fine PDCCH scheduling pattern. In an event that the URLLC traffic is bursty, the fine PDCCH scheduling pattern may be triggered at the start of the packets arrival. For example, processor 312 may be configured to determine whether the URLLC traffic is activated/received. Processor 312 may switch to the fine PDCCH scheduling pattern for the URLLC traffic. In an event that no URLLC traffic is activated/received, processor 312 may switch to the coarse PDCCH scheduling pattern to reduce power consumption. In an event that the URLLC traffic is periodic, the finer PDCCH scheduling pattern may be triggered periodically at the start of each transmission period. Thus, at the start of each traffic arrival period, processor 312 may be configured to perform PDCCH monitoring with the fine PDCCH scheduling pattern. After that, processor 312 may be configured to perform PDCCH monitoring with the coarse PDCCH scheduling pattern to reduce power consumption.

In some implementations, the first PDCCH monitoring configuration may comprise a first PDCCH monitoring configuration parameter (e.g., a first PDCCH monitoring periodicity). The second PDCCH monitoring configuration may comprise a second PDCCH monitoring configuration parameter (e.g., a second PDCCH monitoring periodicity) which is different from the first PDCCH monitoring configuration parameter. Network apparatus 320 may configure the Monitoring-periodicity-PDCCH-slot parameter RRC signaling and takes one of the following values 1-slot, 2-slots, 5-slots, 10-slots and 20-slots. Network apparatus 320 may dynamically change the Monitoring-periodicity-PDCCH-slot parameter via DCI. Processor 312 may use 1-slot periodicity when there is URLLC traffic, and another periodicity when there is no URLLC traffic. Processor 312 may also switch dynamically between two PDCCH monitoring configurations with two different values of Monitoring-periodicity-PDCCH-slot (e.g., one fine and one coarse). Processor 312 may also switch dynamically between two search space sets with two different associated values of Monitoring-periodicity-PDCCH-slot (e.g., one fine and one coarse).

In some implementations, network apparatus 320 may trigger each configuration based on the knowledge of packets in the queue for downlink traffic. Alternatively, network apparatus 320 may trigger each configuration based on the SR (e.g., associated to high priority logical channel) sent by communication apparatus 310 for dynamic grant or the initial PUSCH for configured grant or based on the BSR information on queue status in memory 314. On the other hand, processor 312 may be able to indicate the need to switch to different configuration. Processor 312 may be configured to transmit, via transceiver 316, an uplink signal to indicate a need to switch to the first PDCCH monitoring configuration or the second PDCCH monitoring configuration. For example, processor 312 may indicate the need for activation of fine configuration by the SR or the initial PUSCH for configured grant or any other dedicated signal. Processor 312 may indicate the need for de-activation of the fine configuration by the reported BSR information. Processor 312 may trigger the fine PDCCH monitoring configuration upon the decoding of the URLLC DCI format, some specific RNTIs (e.g., MCS-C-RNTI), or the reception of the DCI in a specific search space or CORESET. Processor 312 may also trigger the fine PDCCH monitoring configuration by a defined field in the DCI or other control signal.

In some implementations, the first PDCCH monitoring configuration may comprise a first #CCE and/or #BD budget. The second PDCCH monitoring configuration may comprise a second #CCE and/or #BD budget which is different from the first #CCE and/or #BD budget. When there is no URLLC traffic, processor 312 doesn't need to do the channel estimation and the decoding of a large number of CCEs. For example, processor 312 may use the first #CCE and/or #BD budget to perform PDCCH monitoring when there is no URLLC traffic. Processor 312 may use the second #CCE and/or #BD budget to perform PDCCH monitoring for URLLC traffic. The second #CCE and/or #BD budget may be larger than the first #CCE and/or #BD budget. In another example, processor 312 may use the increased #CCEs and #BDs budgets in Rel-16 for URLLC service only for the fine PDCCH monitoring. Processor 312 may fall-back to the Rel-15 maximum number of CCEs and/or BDs or to the #CCEs and/or #BDs defined for eMBB services (e.g., in Rel-15 or Rel-16) for the coarse PDCCH monitoring. Processor 312 may also be configured to switch between two #CCEs and/or #BDs budgets (e.g., Rel-16 and Rel-15 budgets).

In some implementations, the first PDCCH monitoring configuration may comprise a first PDCCH monitoring span configuration. The second PDCCH monitoring configuration may comprise a second PDCCH monitoring span configuration which is different from the first PDCCH monitoring span configuration. Processor 312 may be configured with two or more PDCCH monitoring span configurations. For example, processor 312 may report two or multiple sets of candidates (X,Y) or (X,Y,M). Each set may be associated to a coarse or fine PDCCH monitoring spans. In an event that processor 312 reports two sets of candidates, processor 312 may end up with two PDCCH monitoring span configurations. One may be coarse PDCCH monitoring span, and one may be fine PDCCH monitoring span. In another example, processor 312 may also have two or more PDCCH monitoring span configurations with different #CCEs and/or #BDs budgets per span. One PDCCH monitoring span configuration may have large #CCEs and/or #BDs budgets to meet the URLLC reliability and latency requirements. Another PDCCH monitoring span configuration may have reduced #CCEs and/or #BDs budgets for reduced power consumption. Processor 312 may switch between the two monitoring span configurations dynamically or semi-statically.

In some implementations, processor 312 may use the first PDCCH monitoring configuration on eMBB traffic. Processor 312 may use the second PDCCH monitoring configuration on URLLC traffic. Processor 312 may fall-back to the eMBB or Rel-15 budgets when there is no URLLC traffic. Processor 312 may use the eMBB or Rel-15 budgets as default activate/de-activate the new URLLC budgets with the URLLC traffic. Processor 312 may be able to switch between different #CCEs and/or #BDs budgets based on different traffic types.

Illustrative Processes

Figure 4:
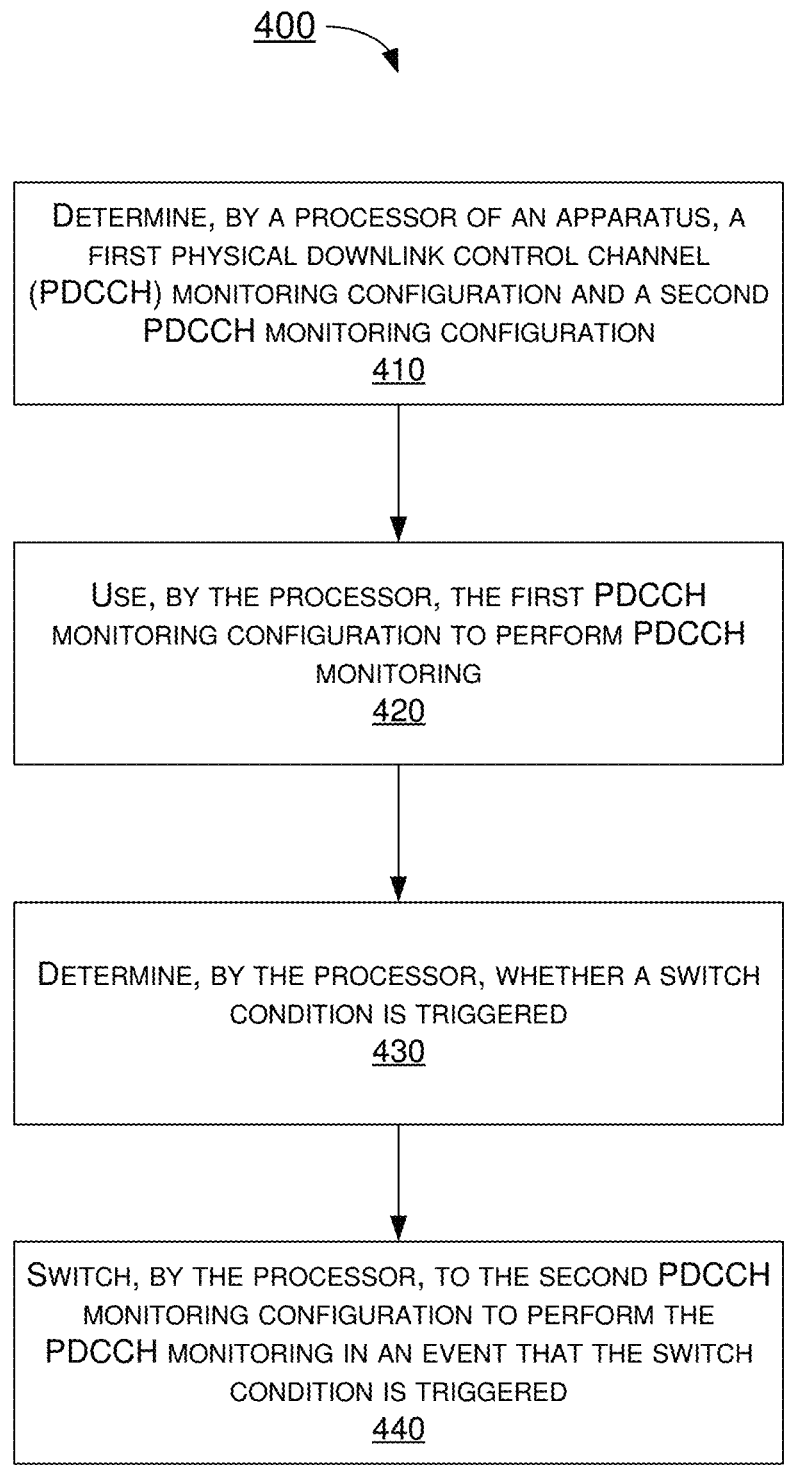
FIG. 4 is a flowchart of an example process in accordance with an implementation of the present disclosure.

FIG. 4 illustrates an example process 400 in accordance with an implementation of the present disclosure. Process 400 may be an example implementation of above scenarios/schemes, whether partially or completely, with respect to UE power consumption enhancement for URLLC services with the present disclosure. Process 400 may represent an aspect of implementation of features of communication apparatus 310. Process 400 may include one or more operations, actions, or functions as illustrated by one or more of blocks 410, 420, 430 and 440. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may be implemented by communication apparatus 310 or any suitable UE or machine type devices. Solely for illustrative purposes and without limitation, process 400 is described below in the context of communication apparatus 310. Process 400 may begin at block 410.

At 410, process 400 may involve processor 312 of apparatus 310 determining a first PDCCH monitoring configuration and a second PDCCH monitoring configuration. Process 400 may proceed from 410 to 420.

At 420, process 400 may involve processor 312 using the first PDCCH monitoring configuration to perform PDCCH monitoring. Process 400 may proceed from 420 to 430.

At 430, process 400 may involve processor 312 determine whether a switch condition is triggered. Process 400 may proceed from 430 to 440.

At 440, process 400 may involve processor 312 switching to the second PDCCH monitoring configuration to perform the PDCCH monitoring in an event that the switch condition is triggered.

In some implementations, the first PDCCH monitoring configuration may comprise a first PDCCH monitoring pattern. The second PDCCH monitoring configuration may comprise a second PDCCH monitoring pattern which is different from the first PDCCH monitoring pattern.

In some implementations, the switch condition may comprise that a packet arrival pattern or a traffic type is changed.

In some implementations, the first PDCCH monitoring configuration may comprise a coarse PDCCH scheduling pattern. The second PDCCH monitoring configuration may comprise a fine PDCCH scheduling pattern.

In some implementations, the first PDCCH monitoring configuration may comprise a first PDCCH monitoring configuration parameter. The second PDCCH monitoring configuration may comprise a second PDCCH monitoring configuration parameter which is different from the first PDCCH monitoring configuration parameter.

In some implementations, the switch condition may comprise a downlink or uplink control signal.

In some implementations, process 400 may involve processor 312 switching dynamically between two search space sets with two different associated periodicities.

In some implementations, process 400 may involve processor 312 transmitting an uplink signal to indicate a need to switch to the first PDCCH monitoring configuration or the second PDCCH monitoring configuration.

In some implementations, the first PDCCH monitoring configuration may comprises a Realease-15 number of CCE and BD budget. The second PDCCH monitoring configuration may comprises a Realease-16 number of CCE and BD budget which is different from the Realease-15 number of CCE and BD budget.

In some implementations, the first PDCCH monitoring configuration may comprise a first PDCCH monitoring span configuration. The second PDCCH monitoring configuration may comprise a second PDCCH monitoring span configuration which is different from the first PDCCH monitoring span configuration.

In some implementations, the first PDCCH monitoring configuration may be used on eMBB traffic. The second PDCCH monitoring configuration may be used on URLLC traffic.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    determining, by a processor of an apparatus, one of a first physical downlink control channel (PDCCH) monitoring configuration and a second PDCCH monitoring configuration among multiple PDCCH monitoring configurations, with which the apparatus is configured, to use in PDCCH monitoring;
    using, by the processor, the first PDCCH monitoring configuration to perform PDCCH monitoring;
    determining, by the processor, whether a switch condition is triggered; and switching, by the processor, to the second PDCCH monitoring configuration to perform the PDCCH monitoring in an event that the switch condition is triggered; and switching dynamically between two search space sets with two different associated periodicities, wherein the first PDCCH monitoring configuration comprises a coarse PDCCH scheduling pattern, wherein the second PDCCH monitoring configuration comprises a fine PDCCH scheduling pattern, wherein the multiple PDCCH monitoring configurations pertain to monitoring occasions or monitoring periods to either meet latency and reliability requirements or reduce power consumption, and wherein the multiple PDCCH monitoring configurations differ from each other in monitoring frequency and duration.

2. The method of claim 1, wherein the first PDCCH monitoring configuration comprises a first PDCCH monitoring pattern, and wherein the second PDCCH monitoring configuration comprises a second PDCCH monitoring pattern which is different from the first PDCCH monitoring pattern.

3. The method of claim 1, wherein the switch condition comprises that a packet arrival pattern or a traffic type is changed.

4. The method of claim 1, wherein the first PDCCH monitoring configuration comprises a first PDCCH monitoring configuration parameter, and wherein the second PDCCH monitoring configuration comprises a second PDCCH monitoring configuration parameter which is different from the first PDCCH monitoring configuration parameter.

5. The method of claim 1, further comprising:
transmitting, by the processor, an uplink signal to indicate a need to switch to the first PDCCH monitoring configuration or the second PDCCH monitoring configuration.

6. The method of claim 1, wherein the first PDCCH monitoring configuration comprises a Realease-15 number of control channel element (CCE) and blind decoding (BD) budget, and wherein the second PDCCH monitoring configuration comprises a Release-16 number of CCE and BD budget which is different from the Release-15 number of CCE and BD budget.

7. The method of claim 1, wherein the first PDCCH monitoring configuration comprises a first PDCCH monitoring span configuration, and wherein the second PDCCH monitoring configuration comprises a second PDCCH monitoring span configuration which is different from the first PDCCH monitoring span configuration.

8. The method of claim 1, wherein the first PDCCH monitoring configuration is used on enhanced mobile broadband (eMBB) traffic, and wherein the second PDCCH monitoring configuration is used on ultra-reliable low-latency communication (URLLC) traffic.

9. An apparatus, comprising:
a transceiver which, during operation, wirelessly communicates with network nodes of a wireless network; and
a processor communicatively coupled to the transceiver such that, during operation, the processor performs operations comprising:
determining one of a first physical downlink control channel (PDCCH) monitoring configuration and a second PDCCH monitoring configuration among multiple PDCCH monitoring configurations, with which the apparatus is configured, to use in PDCCH monitoring;

using the first PDCCH monitoring configuration to perform PDCCH monitoring;

determining whether a switch condition is triggered; and switching to the second PDCCH monitoring configuration to perform the PDCCH monitoring in an event that the switch condition is triggered; and switching dynamically between two search space sets with two different associated periodicities, wherein the first PDCCH monitoring configuration comprises a coarse PDCCH scheduling pattern, wherein the second PDCCH monitoring configuration comprises a fine PDCCH scheduling pattern, wherein the multiple PDCCH monitoring configurations pertain to monitoring occasions or monitoring periods to either meet latency and reliability requirements or reduce power consumption, and wherein the multiple PDCCH monitoring configurations differ from each other in monitoring frequency and duration.

10. The apparatus of claim 9, wherein the first PDCCH monitoring configuration comprises a first PDCCH monitoring pattern, and wherein the second PDCCH monitoring configuration comprises a second PDCCH monitoring pattern which is different from the first PDCCH monitoring pattern.

11. The apparatus of claim 9, wherein the switch condition comprises that a packet arrival pattern or a traffic type is changed.

12. The apparatus of claim 9, wherein the first PDCCH monitoring configuration comprises a first PDCCH monitoring periodicity, and wherein the second PDCCH monitoring configuration comprises a second PDCCH monitoring periodicity which is different from the first PDCCH monitoring periodicity.

13. The apparatus of claim 9, wherein, during operation, the processor further performs operations comprising:
transmitting, via the transceiver, an uplink signal to indicate a need to switch to the first PDCCH monitoring configuration or the second PDCCH monitoring configuration.

14. The apparatus of claim 9, wherein the first PDCCH monitoring configuration comprises a Realease-15 number of control channel element (CCE) and blind decoding (BD) budget, and wherein the second PDCCH monitoring configuration comprises a Release-16 number of CCE and BD budget which is different from the Release-15 number of CCE and BD budget.

15. The apparatus of claim 9, wherein the first PDCCH monitoring configuration comprises a first PDCCH monitoring span configuration, and wherein the second PDCCH monitoring configuration comprises a second PDCCH monitoring span configuration which is different from the first PDCCH monitoring span configuration.

16. The apparatus of claim 9, wherein the first PDCCH monitoring configuration is used on enhanced mobile broadband (eMBB) traffic, and wherein the second PDCCH monitoring configuration is used on ultra-reliable low-latency communication (URLLC) traffic.

* * * * *